No. 647,235. Patented Apr. 10, 1900.
M. SAULT.
THREADED BOLT FOR NUT LOCKS.
(Application filed Nov. 10, 1899.)

(No Model.)

Witnesses.
Mark Sault.
Inventor
By Attys Seymour & Earle

UNITED STATES PATENT OFFICE.

MARK SAULT, OF ESSEX, CONNECTICUT.

THREADED BOLT FOR NUT-LOCKS.

SPECIFICATION forming part of Letters Patent No. 647,235, dated April 10, 1900.

Application filed November 10, 1899. Serial No. 736,477. (No model.)

*To all whom it may concern:*

Be it known that I, MARK SAULT, of Essex, in the county of Middlesex and State of Connecticut, have invented a new Improvement in Threaded Bolts; and I do hereby declare the following, when taken in connection with the accompanying drawings and the letters of reference marked thereon, to be a full, clear, and exact description of the same, and which said drawings constitute part of this specification, and represent, in—

Figure 1:
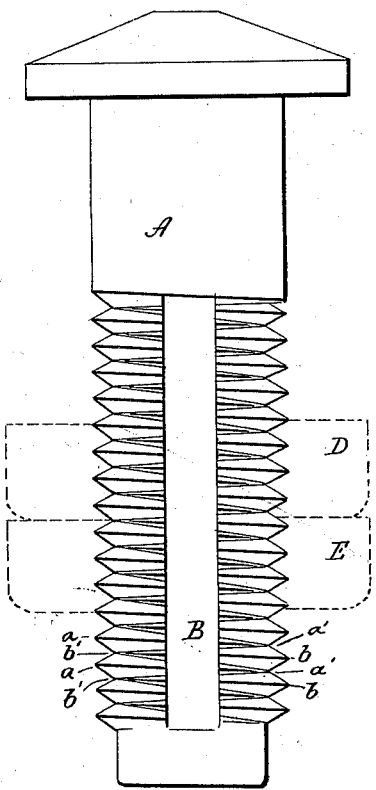
Figure 2:
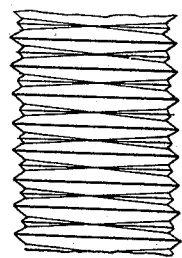
Figure 3:
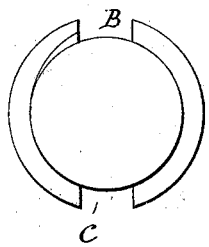

Figure 1, a side view of a bolt threaded in accordance with my invention; Fig. 2, a side view of the same bolt turned one-fourth around from that shown in Fig. 1; Fig. 3, an end view of the bolt.

This invention relates to an improvement in threaded bolts, and while particularly adapted for use with two nuts, so that one locks the other, the invention is equally applicable for bolts using a single nut, the object of the invention being to thread the bolt with right and left hand threads so arranged with relation to each other that right and left hand threaded nuts may be applied; and it consists in the construction, as will be hereinafter described, and particularly recited in the claim.

For convenience of illustration I have shown my invention as applied to a fish-plate bolt; but it is evident without further illustration that it is applicable for bolts of any character or with threaded shanks for any purpose with which nuts are employed.

The shank or body A is cut with right and left hand threads so run together that a portion of the threads for one hand also serves as a portion of the threads for the other hand, and the threads on the shank have the appearance of extending somewhat more than half-way around the bolt and each thread on one side running out between the threads on the opposite side of a central line. Thus the threads $a$ on one side seem to run out in points $a'$ between the threads $b$ on the opposite side, and the threads $b$ appear to run out in points $b'$ between the threads $a$. On opposite sides of the bolt, where the ends of the threads appear to pass, longitudinal grooves B C are formed, the said grooves crossing the body of the threads and so as to leave the points $a'$ on one side and the points $b'$ on the opposite side. The width of these grooves varies with the size of the bolt, and it is only necessary that it should be wide enough to permit the nut to pass from the threads on one side onto the threads on the opposite side. With the threads thus cut either right or left hand threaded nuts D E may be applied, and when turned together one forms a jam or lock nut for the other. In turning the nuts on, the threads on the nut of one hand riding over the thread $a$ will be caught by the point $b'$ and led onto the next thread $b$. On the other hand, a nut reversely threaded will, when turned over the thread $b$, be caught by the point $a'$ and led onto the next thread $a$ and so advanced over the screw in the reverse direction. It will thus be seen that a bolt or rod thus threaded may receive either a right or left hand screw-threaded nut, or both, and either will hold as rigidly as though the bolt were threaded in the ordinary manner.

By arranging the grooves so as to cross the body of the bolts I am enabled to provide a bearing for the nut throughout the greater portion of the circumference of the bolt, and with this arrangement also the nuts more readily catch the proper threads when they are turned on.

It is clear from the invention as described that bolts or stay-rods or other parts of bridge, architectural, or machine work may be threaded in this way and so as to receive either right or left hand threaded nuts, according to the direction of strain to be resisted, and, if desired, a second nut reversely threaded to that of the first nut may be applied as a lock or jam nut therefor.

By the term "bolt" as herein used I wish to be understood as including any bolt or shank which may be threaded for the reception of nuts.

I am aware that bolts have been double-threaded, whereby either right or left hand nuts may be applied, and therefore do not wish to be understood as claiming, broadly, such as my invention; but, Having fully described my invention, what I claim as new, and desire to secure by Letters Patent, is—

A bolt having right and left hand screw-threads, a portion of the threads of one hand serving as a portion of the threads for the other hand, the bolt formed on opposite sides with longitudinal grooves crossing the body
5 of the threads, and so as to leave the points of the threads on opposite sides of the grooves, substantially as described.

In testimony whereof I have signed this specification in the presence of two subscribing witnesses.

MARK SAULT.

Witnesses:
FRED C. EARLE,
LILLIAN D. KELSEY.